(12) United States Patent
Wait (10) Patent No.: US 12,427,867 B2
(45) Date of Patent: Sep. 30, 2025

(54) METHODS AND SYSTEMS FOR CONTROLLING BATTERY ELECTRIC LOCOMOTIVES

(71) Applicant: Progress Rail Locomotive Inc., LaGrange, IL (US)

(72) Inventor: Keith Wait, Flower Mound, TX (US)

(73) Assignee: Progress Rail Locomotive Inc., LaGrange, IL (US)

( * ) Notice: Subject to any disclaimer, the term of this patent is extended or adjusted under 35 U.S.C. 154(b) by 186 days.

(21) Appl. No.: 18/481,310

(22) Filed: Oct. 5, 2023

(65) Prior Publication Data
US 2025/0115137 A1    Apr. 10, 2025

(51) Int. Cl.
*B60L 15/20* (2006.01)
*B60L 50/60* (2019.01)
*B60L 58/10* (2019.01)

(52) U.S. Cl.
CPC .......... *B60L 15/2009* (2013.01); *B60L 50/60* (2019.02); *B60L 58/10* (2019.02); *B60L 2200/26* (2013.01)

(58) Field of Classification Search
CPC ...... B60L 15/2009; B60L 50/60; B60L 58/10; B60L 2200/26
See application file for complete search history.

(56) References Cited

U.S. PATENT DOCUMENTS

| | | | |
|---|---|---|---|
| 6,615,118 B2 | 9/2003 | Kumar | |
| 7,124,691 B2 * | 10/2006 | Donnelly | B60L 53/14 |
| | | | 105/26.05 |
| 8,587,260 B2 | 11/2013 | Kumar | |
| 8,640,629 B2 | 2/2014 | Barbee et al. | |
| 9,688,296 B2 * | 6/2017 | Shubs, Jr. | B61L 27/40 |
| 9,751,540 B2 | 9/2017 | Cook | |
| 9,821,819 B2 * | 11/2017 | Frazier | B61C 17/02 |
| 2003/0178533 A1 * | 9/2003 | Kornick | B61L 3/127 |
| | | | 246/187 A |
| 2009/0234521 A1 * | 9/2009 | Kumar | B60L 15/2045 |
| | | | 701/19 |
| 2010/0019718 A1 * | 1/2010 | Salasoo | B60L 58/15 |
| | | | 320/128 |
| 2014/0379180 A1 * | 12/2014 | Kral | B60L 15/32 |
| | | | 701/19 |

FOREIGN PATENT DOCUMENTS

| | | |
|---|---|---|
| CN | 106515502 B | 12/2019 |
| CN | 110091880 B | 5/2020 |
| CN | 111071269 B | 3/2021 |

* cited by examiner

*Primary Examiner* — Gertrude Arthur Jeanglaude (57) ABSTRACT

Systems and methods for controlling battery electric locomotives are disclosed. The method for controlling battery electric locomotives includes receiving, via one or more processors, a first set of data associated with the battery electric locomotives of a consist in a train, wherein the first set of data includes battery system data. The method includes processing, via one or more processors, the first set of data to determine the operating conditions of the battery electric locomotives. The method includes causing, via one or more processors, an update to the in-memory representation of the battery electric locomotives in a database to set the battery electric locomotives to a run-state mode or a dynamic braking mode. The method includes generating, via one or more processors, one or more commands for operating the battery electric locomotives of the train based on the updated in-memory representation.

20 Claims, 5 Drawing Sheets

METHODS AND SYSTEMS FOR CONTROLLING BATTERY ELECTRIC LOCOMOTIVES

TECHNICAL FIELD

The present disclosure relates generally to train control systems, and more particularly, to methods and systems for controlling battery electric locomotives.

BACKGROUND

Rail vehicles, such as trains, may include multiple powered units, such as battery electric locomotives, that are mechanically coupled or linked together in a consist. The consist of powered units operates to provide tractive and/or braking efforts to propel and stop the movement of the rail vehicles. The powered units in the consist may change the supplied tractive and/or braking efforts based on data that is communicated to them, for example, operational characteristics data associated with the battery electric locomotives, Positive Train Control (PTC) data, etc. A goal during the operation of the battery electric locomotives is a reliable control system that is capable of efficiently processing the operational characteristics data and PTC data for generating, in real-time or near real-time, driving strategies for rail vehicles. However, generating driving strategies is a difficult, time-consuming, and expensive process, and conventional locomotive control systems are technically challenged in developing generic driving strategies that are not unique to specific arrangements of the battery electric locomotives. Conventional locomotive control systems also encounter technical difficulties in efficiently processing massive quantities of operational characteristics data to generate decisions and/or commands for controlling rail vehicles.

Chinese Patent No. CN111071269B, published on Mar. 23, 2021 ("the '269 patent"), discloses a method for switching to battery powered traction when a train's main power supply is unavailable. When the main power becomes available again, the battery powered traction is discontinued. The method also includes monitoring the status and sufficiency of the battery system prior to and during the battery powered traction state. The '269 patent also discloses reducing auxiliary loads during battery powered traction. However, the method of the '269 patent does not modify an in-memory representation of the consist based on the operational characteristics data of the battery electric locomotives during train control.

The system of the present disclosure may solve one or more of the problems set forth above and/or other problems in the art. The scope of the current disclosure, however, is defined by the attached claims, and not by the ability to solve any specific problem.

SUMMARY

In one aspect, a method for controlling one or more battery electric locomotives is disclosed. The method includes: receiving, via one or more processors, a first set of data associated with the one or more battery electric locomotives of a consist in a train, wherein the first set of data includes battery system data; processing, via the one or more processors, the first set of data to determine operating conditions of the one or more battery electric locomotives; causing, via the one or more processors, an update to in-memory representation of the one or more battery electric locomotives in a database to set the one or more battery electric locomotives to a run-state mode or a dynamic braking mode; and generating, via the one or more processors, one or more commands for operating the one or more battery electric locomotives of the train based on the updated in-memory representation.

In another aspect, a train control system associated with a train having one or more battery electric locomotives is disclosed. The train control system includes one or more processors, and at least one non-transitory computer readable medium storing instructions which, when executed by the one or more processors, cause the one or more processors to perform operations including: receiving a first set of data and a second set of data associated with the one or more battery electric locomotives of a consist in the train, wherein the first set of data includes battery system data and the second set of data includes non-battery system data; processing the first set of data and the second set of data to determine an operating conditions of the one or more battery electric locomotives; causing an update to in-memory representation of the one or more battery electric locomotives in a storage unit to set the one or more battery electric locomotives to a run-state mode or a dynamic braking mode; and generating one or more commands for operating the one or more battery electric locomotives of the train based on the updated in-memory representation.

In yet another aspect, a non-transitory computer readable medium for controlling one or more battery electric locomotives is disclosed. The non-transitory computer readable medium stores instructions which, when executed by one or more processors, cause the one or more processors to perform operations including: receiving a first set of data associated with the one or more battery electric locomotives of a consist in a train, wherein the first set of data includes battery system data; processing the first set of data to determine operating conditions of the one or more battery electric locomotives; causing an update to in-memory representation of the one or more battery electric locomotives to set the one or more battery electric locomotives to a run-state mode or a dynamic braking mode; and generating one or more commands for operating the one or more battery electric locomotives based on the updated in-memory representation.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
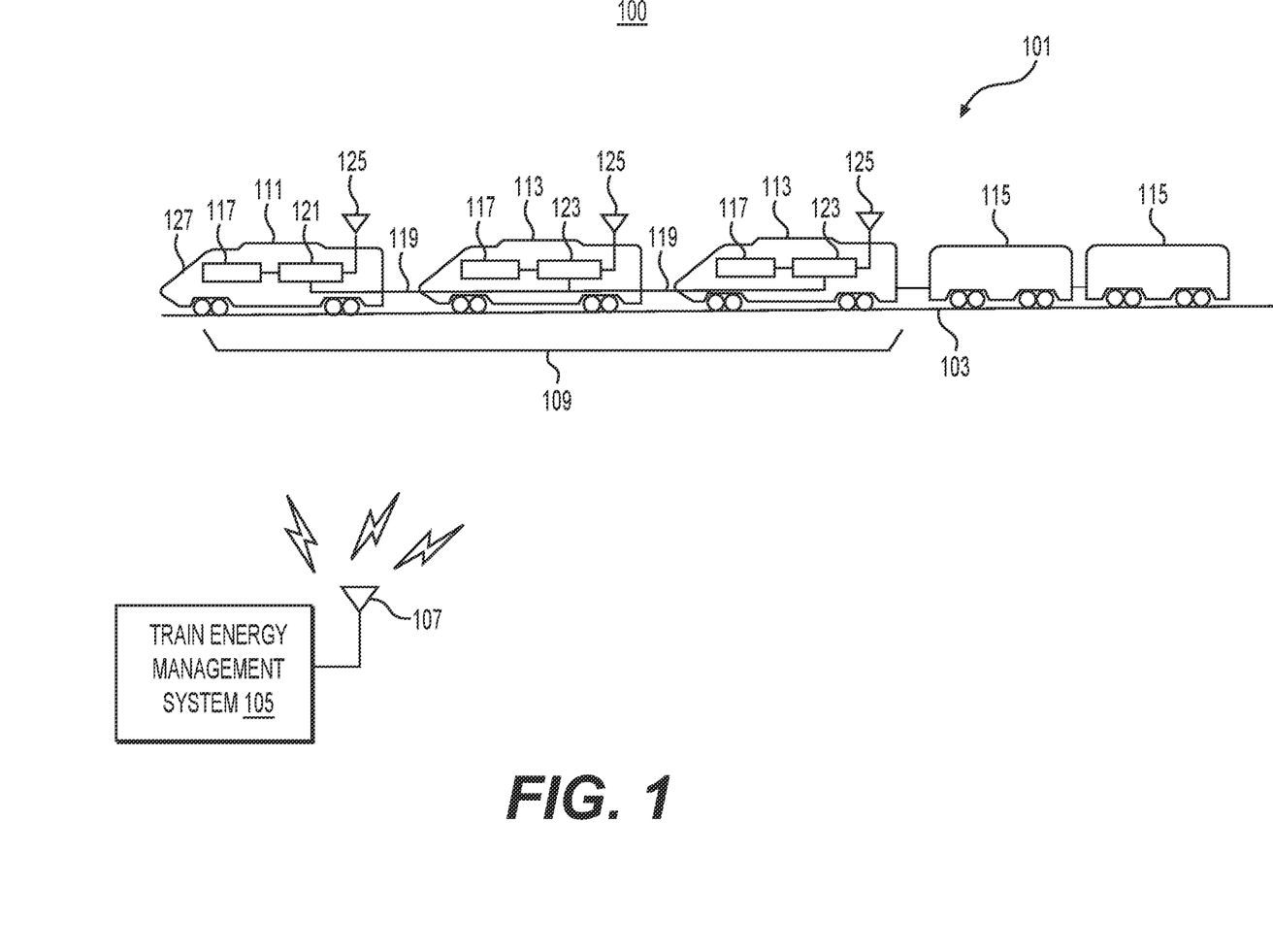
FIG. 1 is a diagram of an exemplary train control system, according to aspects of the disclosure.

FIG. 1 illustrates a schematic diagram of one embodiment of a train control system 100 for a train 101 traveling along a track 103. The train control system 100 may provide for cost savings, improved safety, increased reliability, operational flexibility, and convenience in the control of the train 101 through real-time communication of status data for various battery electric locomotives or other powered units between the train energy management system 105 and the train 101. The train control system 100 may be used to convey a variety of network data and commands and control signals in the form of messages communicated to the train 101, such as packetized data or information that is communicated in data packets, from the train energy management system 105. The data communicated between the train 101 and the train energy management system 105 may include signals indicative of various operational parameters associated with the battery electric locomotives or other powered units, and command and control signals operative to change the state of the battery electric locomotive or other powered unit of the train 101, various circuit breakers, throttles, brake controls, actuators, switches, handles, relays, and any electronically-controllable devices on-board.

In one instance, battery electric locomotives derive energy from rechargeable batteries (e.g., battery assembly) for driving the traction motors of the rail vehicles. These rechargeable batteries may replenish themselves whenever the train is braking, by drawing electricity from an overhead apparatus that connects the train to a power line, or by charging the batteries when stationary at a station or rail yard. In one instance, rechargeable batteries may include lithium-ion batteries or any other types of batteries capable of powering rail vehicles. In one instance, the train control system 100 may monitor and equalize the batteries to maintain a desired state-of-charge and depth-of-discharge. The train control system 100 may operate in coordination with the train energy management system 105 to draw currents from the batteries to drive the plurality of traction motors according to desired throttle levels. The train control system 100 may also monitor the batteries with temperature sensors and may cause cooling or air-circulation equipment to equalize battery temperatures.

The train 101 may include multiple rail cars (including powered and/or non-powered rail cars or units) linked together as one or more consists, or a single rail car (a powered or non-powered rail car or unit). In this instance, the train 101 may include a lead battery electric locomotive consist 109 of powered battery electric locomotives, including the interconnected powered units 111 and 113, and additional non-powered units 115. In one instance, the "powered units" may refer to rail cars that are capable of self-propulsion, such as battery electric locomotives. For example, a plurality of batteries (e.g., battery assembly) may be installed on the powered units 111 and 113, and coupled to traction motors via a DC bus. The plurality of batteries may provide sufficient amount of energy to propel the powered units 111 and 113. In one instance, the "non-powered units" may refer to rail cars that are incapable of self-propulsion, but which may otherwise receive electric power for other services. As illustrated in FIG. 1, the powered units 111 and 113 may represent battery electric locomotives joined with each other in the lead battery electric locomotive consist 109. The lead battery electric locomotive consist 109 may represent a group of two or more battery electric locomotives in the train 101 that are mechanically coupled or linked together to travel along a route.

In one instance, the powered units 111 and 113 of the lead battery electric locomotive consist 109 may include a lead powered unit 111, such as a lead battery electric locomotive, and one or more trailing powered units 113, such as trailing battery electric locomotives. As used herein, the terms "lead" and "trailing" are designations of different powered units, and do not necessarily reflect the positioning of the powered units 111 and 113 in the train 101 or the lead battery electric locomotive consist 109. The term "lead" may refer to a powered unit that is designated for primary control of the lead battery electric locomotive consist 109, and "trailing" may refer to powered units that are under at least partial control of the lead powered unit. The powered units 111 and 113 may include a connection at each end to couple a propulsion subsystems 117 such that the powered units 111 and 113 in the lead battery electric locomotive consist 109 may function together as a single tractive unit. The propulsion subsystems 117 may include battery, electric, and/or mechanical devices and components, such as battery-operated engines, diesel engines, electric generators, and traction motors, used to provide tractive effort that propels the powered units 111 and 113 and braking effort that slows the powered units 111 and 113. The propulsion subsystems 117 of the powered units 111 and 113 in the lead battery electric locomotive consist 109 may be connected and communicatively coupled with each other by a network connection 119. In one instance, the network connection 119 may include train lines, a net port, and/or jumper cables that extend along the train 101 and between the powered units 111 and 113. The network connection 119 may attach the powered units 111 and 113, together, and may configure the trailing powered units 113 to follow the lead powered unit 111.

In one instance, the powered units 111 and 113 may include communication units 121 and 123 configured to communicate information used in the control operations of various components and subsystems, such as the propulsion subsystems 117 of the powered units 111 and 113. The communication unit 121 disposed in the lead powered unit 111 may initiate a transmission, via a WiFi or cellular modem, of data packets forming a message to the train energy management system 105. The message may contain information on the operational state of the battery electric locomotives or the other powered units. For example, the message may contain information on the powered units 111 and 113 (e.g., throttle settings, brake settings, readiness for dynamic braking, the tripping of a circuit breaker on-board, or any other operational characteristics). Alternatively, one or more of the communication units 121 and 123 may be disposed outside of the corresponding powered units 111 and 113, such as in a nearby or adjacent non-powered unit 115. In one instance, the networked communication units 121 and 123 may include antenna modules 125. The antenna modules 125 may represent separate individual antenna modules or sets of antenna modules disposed at different locations along the train 101. The antenna modules 125 may be configured to send data to and receive data from the train energy management system 105.

In one instance, the powered units 111 and 113 may be outfitted with any number and type of sensors known in the art for generating signals indicative of associated operating parameters. In one example, powered units 111 and 113 may include a temperature sensor configured to generate a signal indicative of a coolant temperature of an engine on-board the battery electric locomotive (e.g., the amount of power the system can draw from the batteries is dependent on the ambient temperature). Additionally or alternatively, sensors may include brake temperature sensors, exhaust sensors, pressure sensors, speed sensors, motion detection sensors, location sensors (e.g., global positioning system (GPS)), fuel level sensors, knock sensors, or any other type of sensors. The data generated by these sensors may be transmitted to the train energy management system 105 for further processing and generation of appropriate commands. In addition, the train energy management system 105 may store the signal data in database 209.

Figure 2:
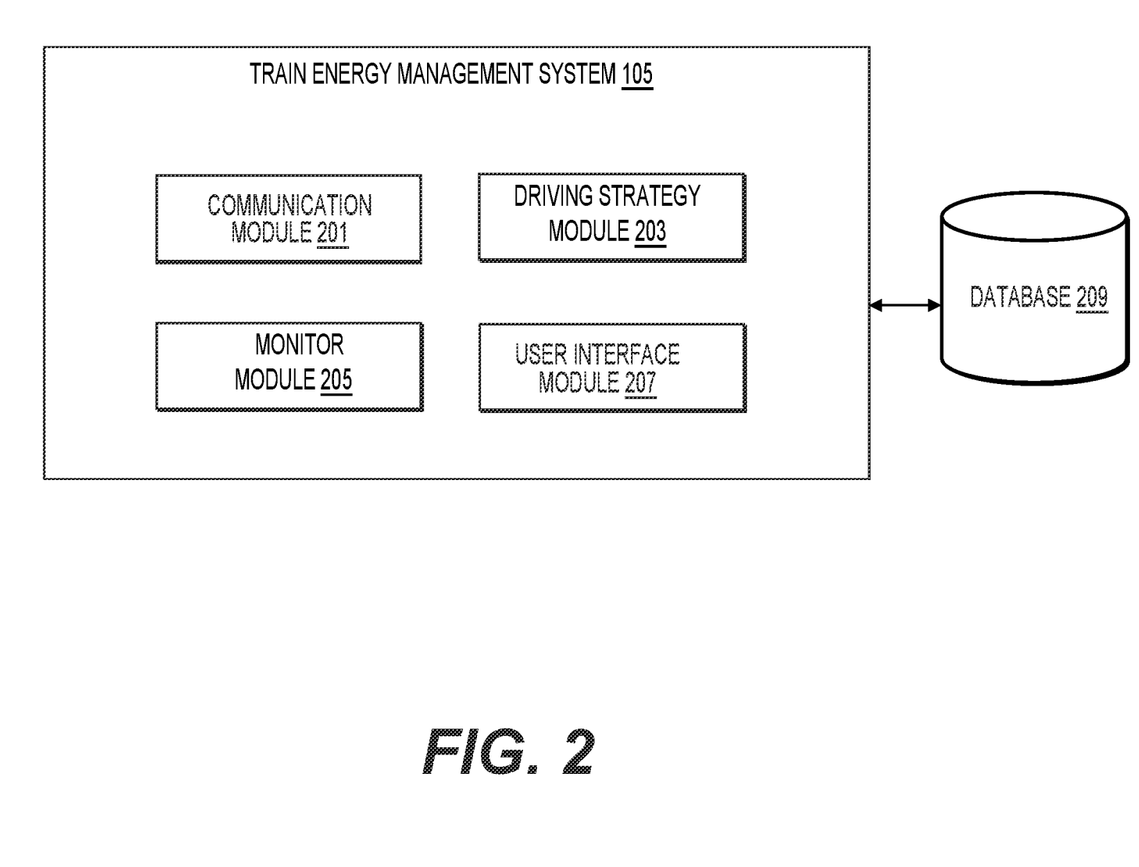
FIG. 2 is a diagram of the components of a train energy management system of the train control system of FIG. 1.

In one instance, the train energy management system 105 is a platform with multiple interconnected components. The train energy management system 105 may include one or more servers, intelligent networking devices, computing devices, components, and corresponding software for controlling the battery electric locomotive of the train 101. In one instance, the train energy management system 105 may include an antenna module 107 configured as a wireless transmitter or transceiver to wirelessly transmit data to the train 101 or receive data from the train 101 or a railroad back office system. Alternatively, the antenna module 107 may be connectors or other components that engage a pathway over which network data is communicated, such as through an Ethernet connection. As illustrated in FIG. 2, the train energy management system 105 may include a communication module 201, a driving strategy module 203, a monitor module 205, and a user interface module 207, or any combination thereof. As used herein, terms such as "component" or "module" generally encompass hardware and/or software, e.g., that a processor or the like used to implement associated functionality. It is contemplated that the functions of these components are combined in one or more components or performed by other components of equivalent functionality.

In one instance, the communication module 201 may collect, in real-time or near real-time, relevant data associated with the train 101 through various data collection techniques. The relevant data may include battery system data (e.g., state-of-charge data, state-of-health data, battery discharge rate, battery charge rate, etc.), non-battery system data (e.g., usage statistics data, temperature data, travel speed data, load data, distance information, etc.), and/or any other operating condition data associated with the battery electric locomotives. For example, the antenna modules 125 may send the relevant data to the antenna module 107 of the train energy management system 105. In one instance, the communication module 201 may use a web-crawling and/or other types of data collection mechanism to access various databases or information sources to collect other relevant data. The other relevant data may include PTC data (e.g., data from a PTC system that utilizes GPS-based safety technology to stop a train and prevent train-to-train collisions, over-speed derailments, and/or unauthorized train movements), track condition information (e.g., maintenance of the railway tracks, damages to railway tracks), railway traffic data, weather conditions (e.g., heavy rain or heavy snow affecting visibility), terrain information, skill or experience level of the railway operators, and so on. In one instance, the communication module 201 includes various software applications (e.g., data mining applications in Extended Meta Language (XML)) that automatically searches for and returns the relevant data and/or other relevant data associated with the train 101. The communication module 201 may transmit, in real-time or near real-time, the collected data to other modules.

In one instance, the driving strategy module 203 may receive data from the communication module 201. The driving strategy module 203 may process the received data to generate one or more decisions regarding operation of the one or more battery electric locomotives in the consist of a train. In one instance, the driving strategy module 203 may process the relevant data (e.g., state-of-charge data, state-of-health data, etc.) and any other relevant data (e.g., PTC data, weather conditions, terrain information, etc.) to generate a prediction regarding availability of the one or more battery electric locomotives in the next instance of time for providing tractive power. For example, the driving strategy module 203 may process the total tractive effort required for an assigned task, the performance capabilities of each battery electric locomotive, real-time location and speed of the train, rail track topography (e.g., altitude, slips, curves, etc.), actual performance of each battery electric locomotive, and/or any other related information to generate a throttle operation command issued to a throttle of the train 101 (e.g., a throttle of a lead battery electric locomotive of the train 101, a throttle of a trailing battery electric locomotive of the train 101, etc.). In one instance, one or more battery electric locomotives may have different load pulling, tractive, and speed capabilities, response time to operational changes, maximum allowable operating temperatures and pressures, and cooling systems for the engine and the battery electric locomotive's traction motors. The driving strategy module 203 may consider such attributes of the battery electric locomotives to generate braking commands (e.g., dynamic braking commands, air braking commands, pneumatic braking commands, etc.) for the lead battery electric locomotive and the distributive group of battery electric locomotives. Accordingly, the driving strategy module 203 may process relevant data, run simulations, and generate a decision in real-time to adjust the power settings of the battery electric locomotives.

In one instance, the monitor module 205 may receive availability information pertaining to one or more battery electric locomotives and various operational commands (e.g., throttle operation command, dynamic braking command, brake command, etc.) from the driving strategy module 203. The monitor module 205 may update, in real-time, an in-memory representation of the consist based on the available information and the various operational commands. In one instance, the monitor module 205 may monitor, in real-time, state-of-health of the batteries of the battery electric locomotives to determine whether the state-of-health is below a pre-determined threshold limit. For example, a longer duration to fully charge the battery, a higher battery discharge rate, a lower energy retention rate, and/or faster temperature increment for similar tasks, may denote the state-of-health of the battery is deteriorating. The monitor module 205 may notify, in real-time, the monitored results to the driving strategy module 203 to make decisions regarding the availability of the battery electric locomotives or generating various operational commands. In another instance, the monitor module 205 may monitor, in real-time, state-of-charge of the batteries of the battery electric locomotives to determine whether the state-of-charge is below the pre-determined threshold limit. The monitor module 205 may notify, in real-time, the monitored results to the driving strategy module 203 to route the train through a dynamic charging station (e.g., catenary (overhead power line), electrified rail, or the like) that is positioned along at least a portion of a route, and may be configured to propel and/or at least partially charge the battery electric locomotives as the train travels along the portion of the route. In another instance, while updating the in-memory representation of the consist, the monitor module 205 may set a battery electric locomotive to a run-state mode or a dynamic braking mode. In one example, upon determining the battery of a battery electric locomotive is sufficiently charged and usable for tractive force generation, the monitor module 205 may set the battery electric locomotive to a run-state mode. In another example, upon determining the battery of a locomotive has sufficiently discharged and cannot be used for tractive force generation, the monitor module 205 may set the battery electric locomotive to the dynamic braking mode for providing dynamic braking. In another instance, the monitor module 205 may monitor, in real-time, various data or instructions received by the train energy management system 105 from the railroad back office system. For example, the railroad back office system may transmit instructions requesting the train energy management system 105 to not utilize batteries at specific segments of the railway tracks or for a certain duration of time. The monitor module 205 may transmit, in real-time or near real-time, the information to the driving strategy module 203 for generating decisions regarding operation of the train 101.

In one instance, the user interface module 207 may enable a presentation of a graphical user interface (GUI) in one or more devices associated with the train 101 or the operator(s) of the train 101. The user interface module 207 may employ various application programming interfaces (APIs) or other function calls, thus enabling interfacing of guidance information (e.g., instructions, commands, annotations, audio messages, video messages, etc.) to the operator(s), display of graphics primitives and maps (e.g., topology and terrain information), presentation of status reports for the battery electric locomotive or other powered unit of the train 101. For example, the user interface module 207 may generate a presentation of a map of at least a portion of the railroad network. The map may also be configured to show sections of the track 103 in relation to certain geographic features (e.g., topographic data, elevation, or other relevant information). For example, the user interface module 207 may generate advance notifications (e.g., warning regarding speed limits, warning regarding oncoming track conditions, etc.) in the cab electronics system of an on-board controller 127 to alert the operator of the train 101.

In one instance, database 209 may be a centralized database, a distributed database, a cloud database, a network database, a hierarchical database, or the like configured to store real-time data corresponding to the battery electric locomotives, consists, or any other components of the train 101. For example, the database 209 may store real-time updates to the in-memory representation of the lead battery electric locomotive consist 109, and may provide the updated data to the one or more modules of the train energy management system 105 for processing. In one instance, the database 209 may store content associated with the train 101 and the train energy management system 105, and may manage multiple types of information that provide means for aiding in the content provisioning and sharing process. It is understood that any other suitable data may be included in the database 209.

Though depicted as a separate entity in FIG. 1, it is contemplated that the train energy management system 105 is also implemented for direct operation by the on-board controller 127 of the lead powered unit 111 of the train 101. In one instance, the on-board controller 127 may be communicatively coupled with the communication unit 121. The on-board controller 127 may include a cab electronics system and a locomotive control system. In one instance, the cab electronics system may include at least one integrated display computer configured to display the control commands received from the train energy management system 105, machine gauges, indicators, sensors, and controls. The cab electronics system may be configured to process and integrate the received commands, and communicate the commands to the locomotive control system. In one instance, the locomotive control system may be communicatively coupled with the batteries, traction motors, engines, generators, braking subsystems, input devices, actuators, circuit breakers, and/or other devices and hardware used to control operation of various components and subsystems on the powered units 111 and 113. For example, the locomotive control system may be configured to control batteries, circuit breakers, throttle settings, braking, etc. on the powered units 111 and 113 in accordance with the commands received from the cab electronics system.

The above presented modules and components of the train energy management system 105 may be implemented in hardware, firmware, software, or a combination thereof. The various executions presented herein contemplate any and all arrangements and models.

Figure 3:
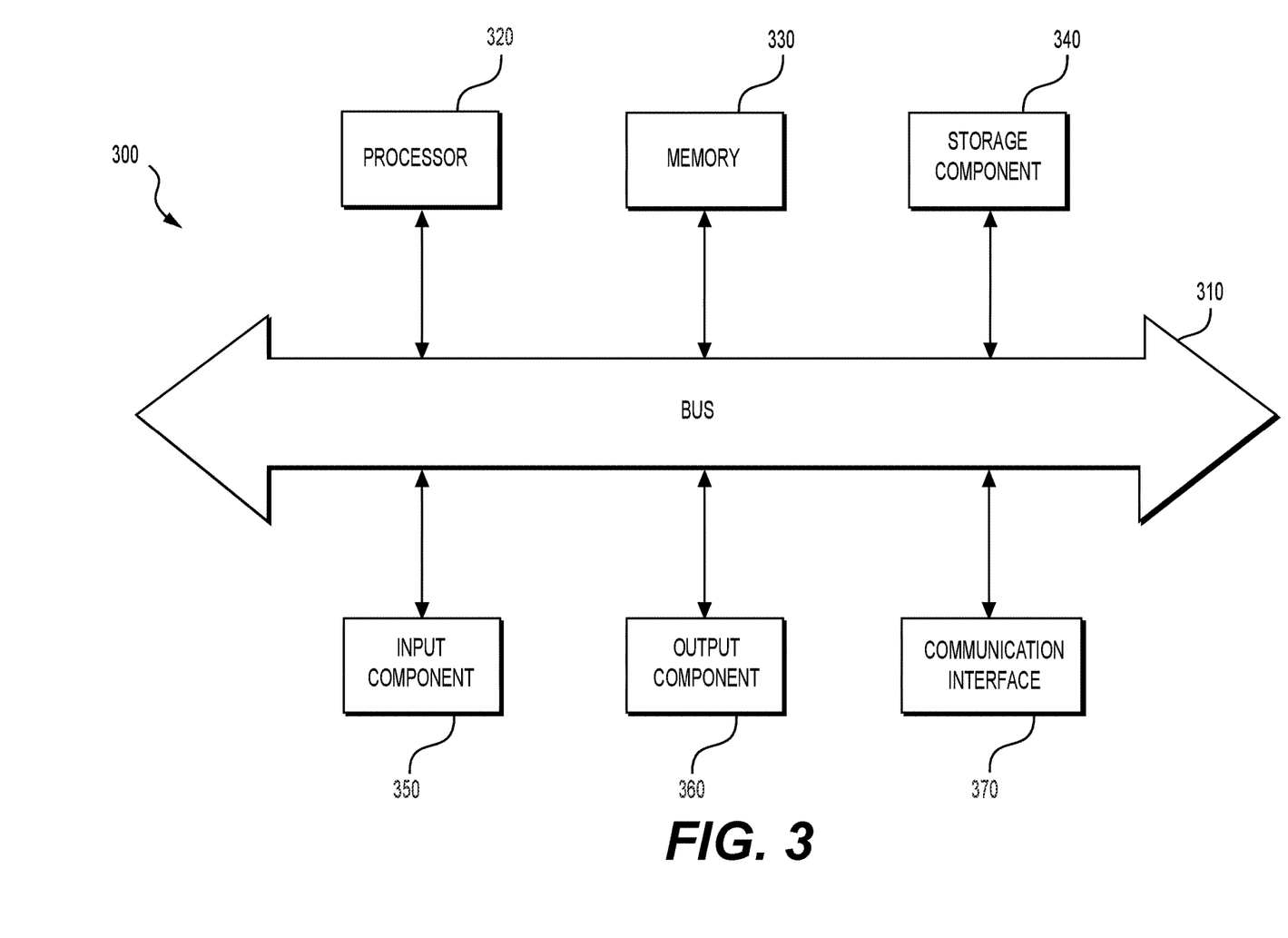
FIG. 3 is a diagram of exemplary components of a computer system that executes the methods implemented by the train control system of FIG. 1.

FIG. 3 illustrates example components of a computer system 300. The computer system 300 may correspond to the train 101 and the train energy management system 105. As shown in FIG. 3, the computer system 300 may include a bus 310, a processor 320, a memory 330, a storage component 340, an input component 350, an output component 360, and a communication interface 370.

The bus 310 includes a component that permits communication among the components of the computer system 300. The processor 320 may be implemented in hardware, firmware, or a combination of hardware and software. The processor 320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component.

The processor 320 may include one or more processors capable of being programmed to perform a function. The memory 330 may include a random access memory (RAM), a read only memory (ROM), and/or another type of dynamic or static storage device (e.g., a flash memory, a magnetic memory, and/or an optical memory) that stores information and/or instructions for use by the processor 320.

The storage component 340 may store information and/or software related to the operation and use of the computer system 300. For example, the storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 350 may include a component that permits the computer system 300 to receive information, such as via user input (e.g., a touch screen display, a keyboard, a keypad, a mouse, a button, a switch, and/or a microphone for receiving the reference sound input). Additionally, or alternatively, the input component 350 may include a sensor for sensing information (e.g., a global positioning system (GPS) component, an accelerometer, a gyroscope, and/or an actuator). The output component 360 may include a component that provides output information from the computer system 300 (e.g., a display, a speaker for outputting sound at the output sound level, etc.).

The communication interface 370 may include a transceiver-like component (e.g., a transceiver and/or a separate receiver and transmitter) that enables the computer system 300 to communicate with other devices, such as via a wired connection, a wireless connection, or a combination of wired and wireless connections. The communication interface 370 may permit the computer system 300 to receive information from another device and/or provide information to another device. For example, the communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

The computer system 300 may perform one or more processes described herein. The computer system 300 may perform these processes based on the processor 320 executing software instructions stored by a non-transitory computer-readable medium, such as the memory 330 and/or the storage component 340. A computer-readable medium may be defined herein as a non-transitory memory device. A memory device may include memory space within a single physical storage device or memory space spread across multiple physical storage devices.

The software instructions may be read into the memory 330 and/or the storage component 340 from another computer-readable medium or from another device via the communication interface 370. When executed, the software instructions stored in the memory 330 and/or the storage component 340 may cause the processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of the components shown in FIG. 3 are provided as an example. In practice, the computer system 300 may include additional components, fewer components, different components, or differently arranged components than those shown in FIG. 3. Additionally, or alternatively, a set of components (e.g., one or more components) of the computer system 300 may perform one or more functions described as being performed by another set of components of the computer system 300.

INDUSTRIAL APPLICABILITY

The disclosed aspects of the system for controlling battery electric locomotives may be applicable to any type of train, such as freight trains, passenger trains, commuter rail trains, express trains, rapid transit trains, high-speed rail trains, monorail trains, or the like. The disclosed aspects of the train control system 100 may be utilized for facilitating signals or data exchange between the train 101 and the train energy management system 105 for controlling battery electric locomotives or any other powered units of the train 101. In one example, the train 101 via one or more sensors may transmit, in real-time, signals or data regarding the status of the batteries (e.g., state-of-charge, state-of-health, etc.) to the train energy management system 105 for determining the operating conditions of the battery electric locomotives. In one example, the train energy management system 105 may receive various data or instructions from the PTC system or the railroad back office system. The train energy management system 105 may process the various data or instructions to manage the battery electric locomotives (e.g., determine their availability for assigned tasks, generate commands to control the battery electric locomotives, update the in-memory representation of the consist, etc.).

Figure 4:
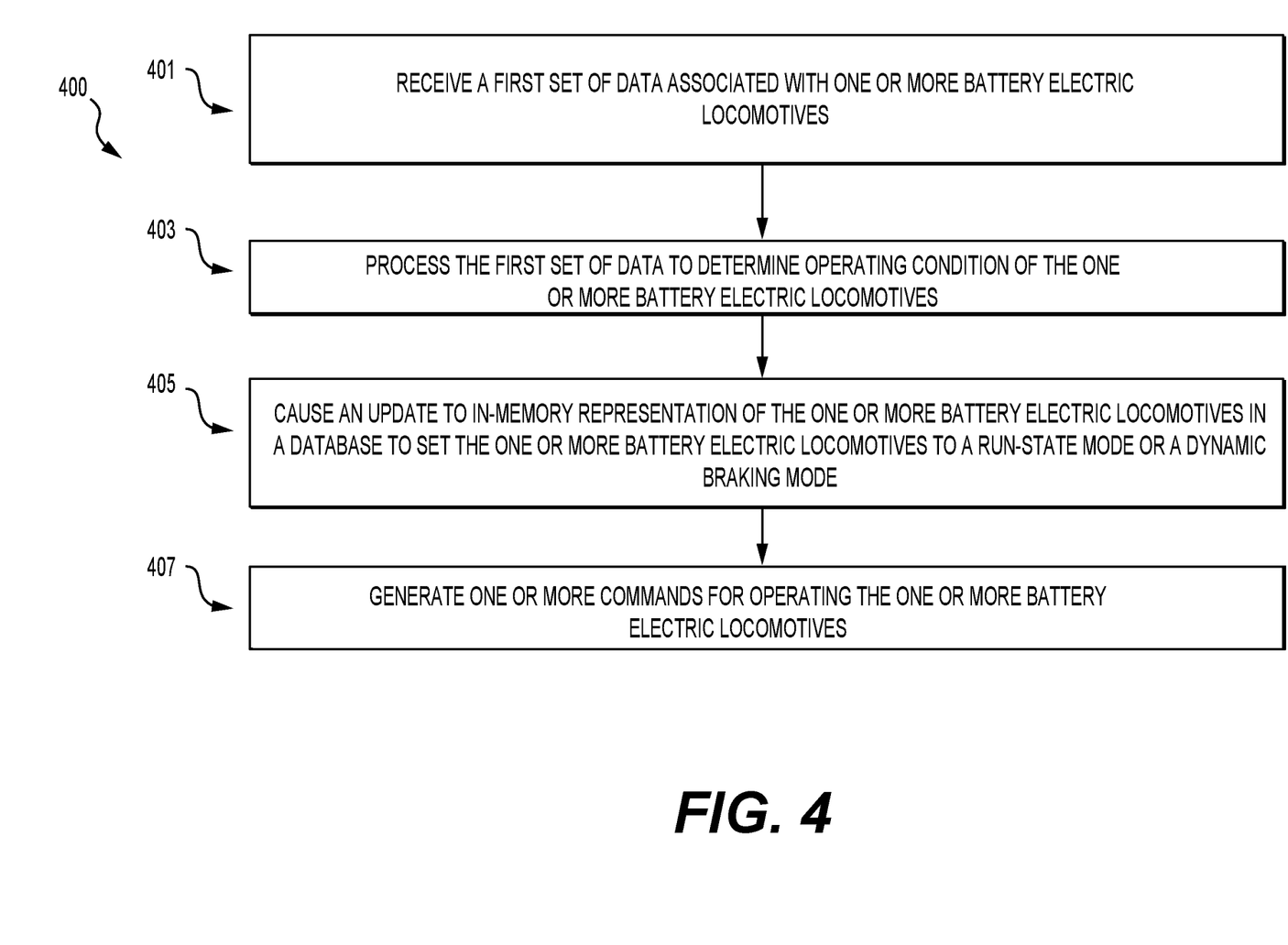
FIG. 4 is a flowchart of a process implemented by the train control system 100 of FIG. 1.

FIG. 4 is a flowchart of a process for managing battery electric locomotives of train 101. In various embodiments, the train energy management system 105 and/or any of the modules 201-207 may perform one or more portions of the process 400 and are implemented using, for instance, a chip set including a processor and a memory as shown in FIG. 3. As such, the train energy management system 105 and/or any of modules 201-207 may provide means for accomplishing various parts of the process 400, as well as means for accomplishing embodiments of other processes described herein in conjunction with other components of the train control system 100. Although the process 400 is illustrated and described as a sequence of steps, it is contemplated that various embodiments of the process 400 are performed in any order or combination and need not include all of the illustrated steps.

In step 401, the train energy management system 105, via processor 320, may receive a first set of data associated with battery electric locomotives (e.g., powered units 111 and 113) of the train 101. The first set of data may include battery system data, such as, state-of-charge data, state-of-health data, temperature data, battery discharge rate, battery charge rate, battery usage data, and/or any other relevant data. For example, the antenna module 107 of the train energy management system 105 may receive the first set of data from the antenna modules 125 of the train 101.

In step 403, the train energy management system 105, via processor 320, may process the first set of data to determine the operating conditions of the powered units 111 and 113. The train energy management system 105 may receive a second set of data while determining the operating conditions of the powered units 111 and 113. In one instance, the second set of data may include non-battery system data, such as, PTC data, environmental data, travel speed data, load data, distance information, rail track topography data, and/or any other relevant data. The train energy management system 105 may process the first and the second set of data to determine the powered units 111 and 113 are either charged and capable of generating a tractive force for a task (e.g., assigned task or a new task) or discharged and incapable of generating the tractive force for the task. In one instance, the train energy management system 105 may generate a prediction regarding the availability of the powered units 111 and 113 for providing tractive force for the future tasks based on the first and the second set of data. In one instance, the train energy management system 105 may monitor, in real-time, the battery system data and/or various other attributes of the batteries of the powered units 111 and 113 to determine whether the battery system data is below a pre-determined threshold limit. The train energy management system 105 may generate commands to update an in-memory representation or a decision regarding availability the of one or more powered units based on the monitoring of the battery system data.

In step 405, the train energy management system 105, via processor 320, may cause an update to an in-memory representation of the powered units 111 and 113 in the database 209. In one instance, the train energy management system 105 may set one or more powered units that are charged and capable of generating the tractive force to a run-state mode. In another instance, the train energy management system 105 may set one or more powered units that are discharged and incapable of generating the tractive force to a dynamic braking mode. For example, when dynamic braking is activated to control train speed, the batteries are charged, saving what would otherwise be wasted energy. It is understood that various other updates to the database 209 are contemplated to indicate the in-memory representation of the battery electric locomotives.

In step 407, the train energy management system 105, via processor 320, may generate commands for operating the powered units 111 and 113. The commands may include throttle operation commands, braking commands (dynamic braking commands, air braking commands, etc.) and/or any other types of commands for operating the powered units 111 and 113.

Figure 5:
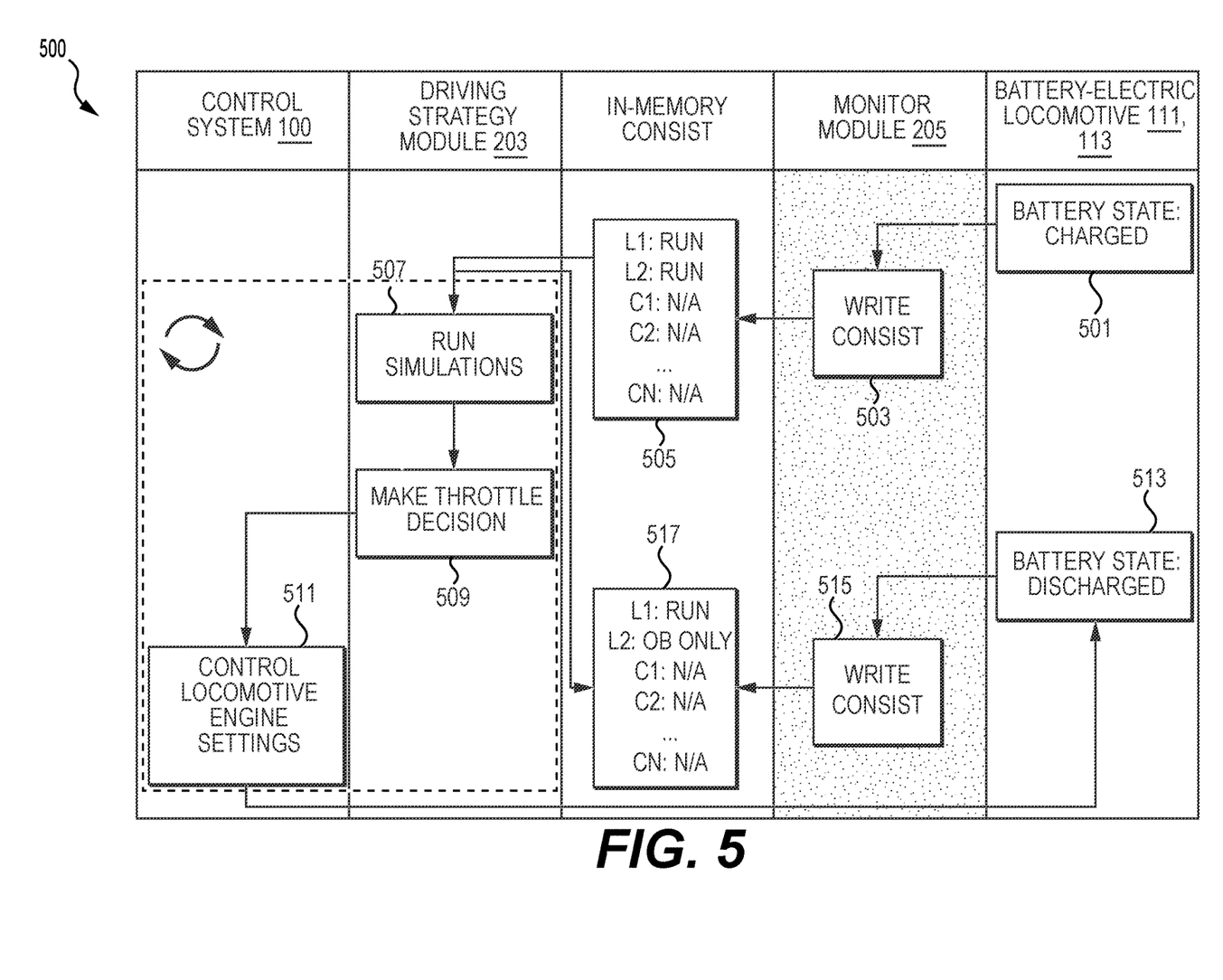
FIG. 5 is a sequence diagram of one embodiment of the train control system 100 of FIG. 1.

FIG. 5 is an exemplary sequence diagram for determining the operational status of one or more battery electric locomotives of a train. Although process 500 is illustrated and described as a sequence of steps, it is contemplated that various embodiments of the process 500 may be performed in any order or combination and need not include all of the illustrated steps.

In step 501, the train energy management system 105 may process state-of-charge data, state-of-health data, battery discharge rate, battery charge rate, and/or any other relevant data associated with the batteries of the battery electric locomotives (e.g., powered units 111 and 113) that are powered by onboard batteries. The train energy management system 105 may determine whether the batteries are charged, healthy, and capable of generating the tractive force required for the assigned tasks.

In step 503, the train energy management system 105, via the monitor module 205, may update the status of the powered units 111 and 113 in the database 209 to state that both the powered units 111 and 113 are in a run-state mode. In step 505, the in-memory consist of train 101 may indicate real-time status of the powered units 111 and 113 (depicted as L1 and L2 in FIG. 5) and non-powered units 115 (depicted as C1, C2, . . . CN) based on the monitoring. For example, powered units 111 and 113 are set to be in a run-state mode.

In step 507, the train energy management system 105, via the driving strategy module 203, may run a simulation (e.g., a physics-based simulation of the real-world run of the train) and generate simulation results as an output to decide on the power settings of the powered units 111 and 113. In step 509, the train energy management system 105, via the driving strategy module 203, may generate various commands (e.g., a throttle operation command issued to a throttle of the train 101, etc.). In step 511, the train energy management system 105 may transmit the commands to the on-board controller 127 of the train 101 to manage the battery electric locomotives.

In step 513, the train energy management system 105, via the monitor module 205, may monitor, in real-time, the operating conditions of the batteries of the powered units 111 and 113 to determine whether the batteries are discharged and are below the predetermined threshold level. In step 515, the train energy management system 105, via the monitor module 205, may update the database 209 to update the in-memory representation of the batteries as discharged, incapable of producing tractive force, and is only capable of producing braking force. In step 517, the in-memory consist of train 101 may indicate the updated status of the powered units 111 and 113 based on the monitoring. This information is then consumed by the driving strategy module 203 to make decisions regarding the operation of the battery electric locomotives. The process 500 monitors the condition of the batteries to manage the battery electric locomotives (e.g., switching off the battery as a power source when the state-of-charge data, state-of-health data, and/or any other relevant data associated with the batteries are below the predetermined threshold level).

The train control system 100 may provide for efficient data processing and improved safety and control of the train 101. For instance, the train control system 100 may monitor, in real-time, the operating conditions of the battery electric locomotives and may update the in-memory representation of the battery electric locomotives. The train control system 100 may modify the commands and/or evaluate the feasibility of various driving strategies based on the updated in-memory representation of the battery electric locomotives. The train control system 100 may also generate generic driving strategies that are not unique to the specific arrangements of the battery electric locomotives by processing the specifics of the power sources for the battery electric locomotives.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method for controlling one or more battery electric locomotives, comprising:
   receiving, via one or more processors, a first set of data associated with the one or more battery electric locomotives of a consist in a train, wherein the first set of data includes battery system data;
   processing, via the one or more processors, the first set of data to determine operating conditions of the one or more battery electric locomotives;
   causing, via the one or more processors, an update to in-memory representation of the one or more battery electric locomotives in a database to set the one or more battery electric locomotives to a run-state mode or a dynamic braking mode; and
   generating, via the one or more processors, one or more commands for operating the one or more battery electric locomotives of the train based on the updated in-memory representation.

2. The method of claim 1, wherein the battery system data includes state-of-charge data, state-of-health data, battery temperature data, battery discharge rate, battery charge rate, and/or battery usage data.

3. The method of claim 1, further comprising:
   receiving, via the one or more processors, a second set of data while determining the operating conditions of the one or more battery electric locomotives, wherein the second set of data includes non-battery system data.

4. The method of claim 3, wherein the non-battery system data includes Positive Train Control (PTC) data, environmental data, travel speed data, load data, distance information, and/or rail track topography data.

5. The method of claim 3, further comprising:
   processing, via the one or more processors, the first set of data and the second set of data to determine the one or more battery electric locomotives are either charged and capable of generating a tractive force for a task or discharged and incapable of generating the tractive force for the task.

6. The method of claim 5, wherein updating the in-memory representation of the one or more battery electric locomotives, further comprises:
setting, via the one or more processors, the one or more battery electric locomotives that are: (i) charged and capable of generating the tractive force to the run-state mode or (ii) discharged and incapable of generating the tractive force to the dynamic braking mode.

7. The method of claim 5, further comprising:
generating, via the one or more processors, a prediction regarding availability of the one or more battery electric locomotives for providing the tractive force for the task based, at least in part, on the first set of data and the second set of data.

8. The method of claim 1, wherein determining the operating conditions of the one or more battery electric locomotives, further comprises:
monitoring, via the one or more processors, the battery system data of the one or more battery electric locomotives;
determining, via the one or more processors, the battery system data is below a pre-determined threshold limit; and
generating, via the one or more processors, the one or more commands for operating the one or more battery electric locomotives.

9. The method of claim 1, wherein the one or more commands include throttle operation commands, dynamic braking commands, and/or air braking commands.

10. A train control system associated with a train having one or more battery electric locomotives, comprising:
one or more processors; and
at least one non-transitory computer readable medium storing instructions which, when executed by the one or more processors, cause the one or more processors to perform operations comprising:
receiving a first set of data and a second set of data associated with the one or more battery electric locomotives of a consist in the train, wherein the first set of data includes battery system data and the second set of data includes non-battery system data;
processing the first set of data and the second set of data to determine an operating conditions of the one or more battery electric locomotives;
causing an update to in-memory representation of the one or more battery electric locomotives in a storage unit to set the one or more battery electric locomotives to a run-state mode or a dynamic braking mode; and
generating one or more commands for operating the one or more battery electric locomotives of the train based on the updated in-memory representation.

11. The system of claim 10, wherein the battery system data includes state-of-charge data, state-of-health data, temperature data, battery discharge rate, battery charge rate, and/or battery usage data.

12. The system of claim 10, wherein the non-battery system data includes Positive Train Control (PTC) data, environmental data, travel speed data, load data, distance information, and/or rail track topography data.

13. The system of claim 10, further comprising:
determining the one or more battery electric locomotives are either charged and capable of generating a tractive force for a task or discharged and incapable of generating the tractive force for the task.

14. The system of claim 13, wherein updating the in-memory representation of the one or more battery electric locomotives, further comprises:
setting the one or more battery electric locomotives that are: (i) charged and capable of generating the tractive force to the run-state mode or (ii) discharged and incapable of generating the tractive force to the dynamic braking mode.

15. The system of claim 13, further comprising:
generating a prediction regarding availability of the one or more battery electric locomotives for providing the tractive force for the task based, at least in part, on the first set of data and the second set of data.

16. The system of claim 10, wherein the one or more commands include throttle operation commands, dynamic braking commands, and/or air braking commands.

17. The system of claim 10, wherein determining the operating conditions of the one or more battery electric locomotives, further comprises:
monitoring the battery system data of the one or more battery electric locomotives;
determining the battery system data is below a pre-determined threshold limit; and
generating the one or more commands for operating the one or more battery electric locomotives of the train.

18. A non-transitory computer readable medium for controlling one or more battery electric locomotives, the non-transitory computer readable medium storing instructions which, when executed by one or more processors, cause the one or more processors to perform operations comprising:
receiving a first set of data associated with the one or more battery electric locomotives of a consist in a train, wherein the first set of data includes battery system data;
processing the first set of data to determine operating conditions of the one or more battery electric locomotives;
causing an update to in-memory representation of the one or more battery electric locomotives to set the one or more battery electric locomotives to a run-state mode or a dynamic braking mode; and
generating one or more commands for operating the one or more battery electric locomotives based on the updated in-memory representation.

19. The non-transitory computer readable medium of claim 18, wherein the battery system data includes state-of-charge data, state-of-health data, temperature data, battery discharge rate, battery charge rate, and/or battery usage data.

20. The non-transitory computer readable medium of claim 18, further comprising:
receiving a second set of data while determining the operating conditions of the one or more battery electric locomotives, wherein the second set of data includes Positive Train Control (PTC) data, environmental data, travel speed data, load data, distance information, and/or rail track topography data; and
processing the first set of data and the second set of data to set the one or more battery electric locomotives to: (i) the run-state mode upon determining the one or more battery electric locomotives are charged and capable of generating a tractive force, or (ii) to the dynamic braking mode upon determining the one or more battery electric locomotives are discharged and incapable of generating the tractive force.

* * * * *